United States Patent
Shi

[19]

[11] Patent Number: 6,055,138
[45] Date of Patent: Apr. 25, 2000

[54] THIN FILM PEDESTAL POLE TIPS WRITE HEAD HAVING NARROWER LOWER PEDESTAL POLE TIP

[75] Inventor: Zhupei Shi, San Jose, Calif.

[73] Assignee: Read-Rite Corporation, Fremont, Calif.

[21] Appl. No.: 09/073,712

[22] Filed: May 6, 1998

[51] Int. Cl.[7] .................................................. G11B 5/147
[52] U.S. Cl. ............................................................ 360/126
[58] Field of Search ...................................... 360/119, 126

[56] References Cited

U.S. PATENT DOCUMENTS

| | | | |
|---|---|---|---|
| 4,436,593 | 3/1984 | Osborne et al. | 204/15 |
| 4,639,289 | 1/1987 | Lazzari | 156/643 |
| 4,821,126 | 4/1989 | Matsumoto | 360/66 |
| 4,837,924 | 6/1989 | Lazzari | 29/603 |
| 4,935,832 | 6/1990 | Das et al. | 360/112 |
| 4,951,166 | 8/1990 | Schewe | 360/119 |
| 4,984,118 | 1/1991 | Springer | 360/125 |
| 4,992,901 | 2/1991 | Keel et al. | 360/110 |
| 5,274,521 | 12/1993 | Miyauchi | 360/119 |
| 5,282,308 | 2/1994 | Chen et al. | 29/603 |
| 5,283,942 | 2/1994 | Chen et al. | 29/603 |
| 5,404,260 | 4/1995 | Machui et al. | 360/126 |
| 5,434,733 | 7/1995 | Hesterman et al. | 360/113 |
| 5,435,053 | 7/1995 | Krounbi et al. | 29/603 |
| 5,438,747 | 8/1995 | Krounbi et al. | 29/603 |
| 5,446,613 | 8/1995 | Rottmayer . | |
| 5,452,164 | 9/1995 | Cole et al. | 360/113 |
| 5,486,968 | 1/1996 | Lee et al. | 360/126 |
| 5,491,606 | 2/1996 | Hesterman et al. | 360/113 |
| 5,576,914 | 11/1996 | Rottmayer et al. . | |
| 5,621,592 | 4/1997 | Gill et al. | 360/113 |
| 5,649,351 | 7/1997 | Cole et al. . | |
| 5,652,687 | 7/1997 | Chen et al. | 360/126 |
| 5,668,689 | 9/1997 | Schultz et al. | 360/113 |

*Primary Examiner*—A. J. Heinz
*Attorney, Agent, or Firm*—Michaelson & Wallace

[57] ABSTRACT

The presently preferred method for fabricating the thin film magnetic head of the present invention includes depositing a first pole layer on a substrate or over a previously formed layer. A portion of the first pole layer is removed, such as by etching or ion milling, to form a first or lower pedestal pole extending from the first pole layer. A write gap layer is deposited and a second or upper pole is formed over the write gap layer. A magnetic flux generator is formed and coupled to the second pole. The magnetic flux generator supplies magnetic flux to the second pole. The first pedestal provides a return path for the flux supplied to the second pole and across the write gap. Typically, a second pedestal is formed by depositing a second pole layer and removing a portion, such as by etching or ion milling, to form the second or upper pedestal pole. The method of the present invention allows the first pedestal to be formed smaller than the second pole. This reduces flux width across the write gap which improves data density. In addition, the present invention provides the first pedestal pole with sidewalls substantially planar and substantially orthogonal to the lower pole layer for lower pedestal pole widths below 2 microns.

25 Claims, 6 Drawing Sheets

THIN FILM PEDESTAL POLE TIPS WRITE HEAD HAVING NARROWER LOWER PEDESTAL POLE TIP

BACKGROUND

1. Field of the Invention

The present invention relates to the field of data storage on magnetic media.

2. Description of Related Art

Data is stored on magnetic media by writing on the magnetic media using a write head. Magnetic media can be formed in any number of ways, such as tape, floppy diskette, and hard disk. Writing involves storing a data bit by utilizing magnetic flux to set the magnetic moment of a particular area on the magnetic media. The state of the magnetic moment is later read, using a read head, to retrieve the stored information.

Data density is determined by the amount of data stored on an area of magnetic media and depends on how much area must be allocated to each bit. Data on magnetic media is often stored in a line or track. Magnetic media often have multiple tracks. In the case of the disk, the tracks are nested annular rings. More bits per ring and more rings per disk increases data density. Data density, therefore, is determined not only by the bit length, but also by the width of the bit which determines the track width.

Data density is controlled by controlling the magnetic flux generated between poles of the write head. Typically write heads do not contact the magnetic media but instead are separated from the magnetic media by a layer of air or air bearing. The magnetic flux generated between the poles acts across the air bearing to change the magnetic moment of an area on the magnetic media.

To decrease bit size, small read and write heads, such as thin film heads, are constructed. Thin film heads commonly employ separate write and read heads. Thin film heads are typically formed by depositing and etching layers of magnetic, non-magnetic, dielectric, and electrically conductive materials. The structure of the heads are defined by selectively exposing photoresist to control where etching and deposition occurs.

Selective exposure commonly employs masks or reticles to control the exposure. Unexposed photoresist is removed so that the surface or layer below may be selectively etched to form the head structure. A significant problem with current thin film head structures and manufacturing techniques, however, is that they have limitations to improving data density. The present invention provides an improved thin film head design and improved production methods which allows for improved data density.

SUMMARY OF THE INVENTION

The presently preferred method for fabricating the thin film magnetic head of the present invention includes depositing a first pole layer on a substrate or over a previously formed layer. A portion of the first pole layer is removed, such as by etching or ion milling, to form a first or lower pedestal pole extending from the first pole layer. A write gap layer is deposited and a second or upper pole is formed over the write gap layer. A magnetic flux generator is formed and coupled to the second pole. The magnetic flux generator supplies magnetic flux to the second pole. The first pedestal provides a return path for the flux supplied to the second pole and across the write gap. Typically, a second pedestal is formed by depositing a second pole layer and removing a portion, such as by etching or ion milling, to form the second or upper pedestal pole.

The method of the present invention allows the first pedestal to be formed smaller than the second pole. This reduces flux width across the write gap which improves data density. In addition, the present invention provides the first pedestal pole with sidewalls substantially planar and substantially orthogonal to the lower pole layer for lower pedestal pole widths below 2 microns.

Not only does focusing the flux in this manner improve data density by reducing flux width across the write gap, it also provides greater flux density and power near the magnetic media which allows data density to be improved by using magnetic media with higher coercivity.

Furthermore, when the first or return pedestal pole is made smaller than the second pedestal pole, side writing is reduced.

In addition, the profile of the smaller pedestal is improved by forming it from the lower rather than the upper pole layer. The profile is more easily controlled because photolithographic mask or reticle focusing and exposure can be more precisely controlled on the lower rather than the upper pole layer.

The method for fabricating the present invention may include planarization steps between deposition steps to flatten or expose surfaces in preparation for the next step. Providing flatter surfaces prior to photolithographic masking, improves profiles.

Although it is presently preferred to form the first pedestal pole from the first pole layer by removing a portion of the pole layer, it is also possible in an alternate embodiment of the present invention to form the first pedestal pole from a layer deposited on or over the lower pole layer.

DETAILED DESCRIPTION

Figure 1:
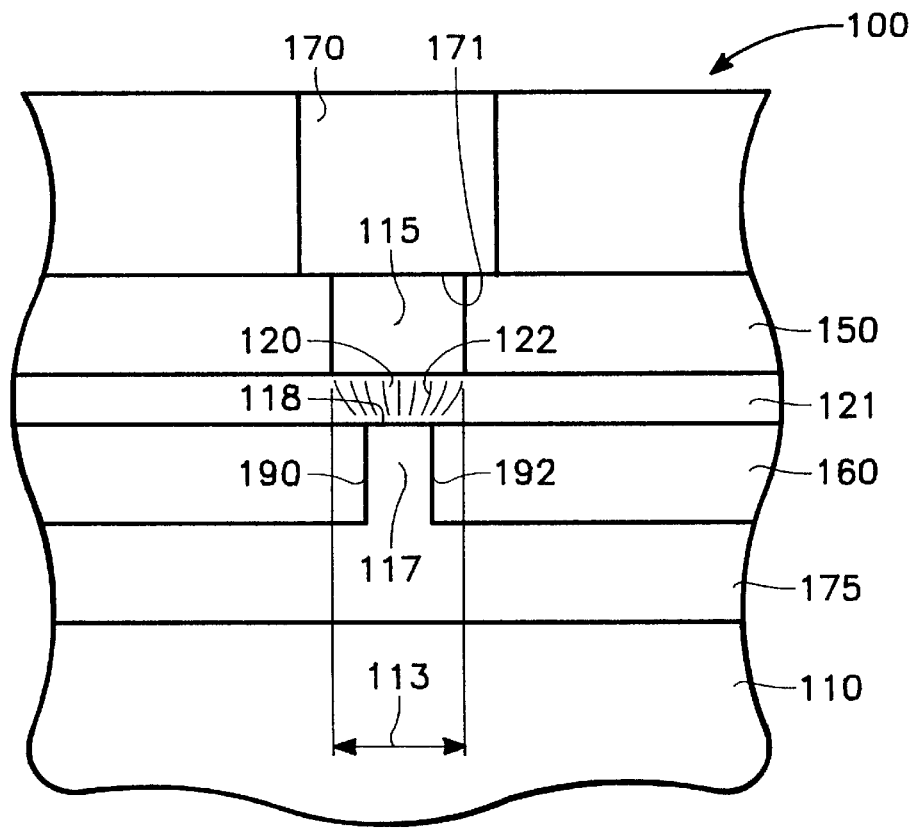
FIG. 1 is a front view of the air bearing surface of the thin film write head of the present invention.

The Presently Preferred Embodiment of the Present Invention (FIG. 1)

FIG. 1 shows a frontal view of the air bearing surface of the presently preferred embodiment of the thin film write head 100 of the present invention. The thin film write head 100 is formed over a substrate layer 110. The substrate 110 may be a wafer, or it may be a layer which is over, or is directly on, the wafer, such as one deposited over a read head, not shown. Therefore, the substrate 110 may be over a previously formed read head.

A lower pedestal pole 117 is provided that extends from lower or first pole layer 175 and forms a lower or first pedestal pole surface 118. A yoke 170 forms a yoke pole surface 171 which is attached to an upper pedestal pole 115. The lower or second pedestal pole 117 is formed narrower than the upper pedestal pole 115 and in the presently preferred embodiment, the upper and lower pedestal poles 115 and 117 are coaxially aligned. The lower pedestal pole 117, the lower pole 175, the upper pedestal pole 115, and the yoke 170 are formed of magnetic materials.

Located between upper pedestal pole 115 and lower pedestal pole 117 is a write gap 120. Typically, the write gap 120 is formed about 0.2 to 0.5 microns across. The write gap 120 is filled with a write gap layer 121. A non-magnetic material forms the write gap layer 121. A non-magnetic material also forms filler layers 160 and 150 adjacent the lower and upper pedestal poles 117 and 115, respectively. The filler layers 160 and 150 provide structural support for the upper and lower pedestal poles 117 and 115. The write-gap layer 121, and the filler layers 160 and 150 may be made of the same non-magnetic material. In the preferred embodiment, the write-gap layer 121, the filler layer 160, and the filler layer 150 are not integrally formed but are rather deposited upon one another. Preferably the filler layers 160 and 150 are planarized prior to depositing the next layer.

In the presently preferred embodiment, the yoke 170 is attached to a core, not shown, of the write head 100. It is presently preferred to provide an integrally formed yoke 170 and core. Magnetic flux is generated by passing current through conductors encircling the core, not shown. Magnetic flux 122 is generated in the core and flows through the yoke 170, flows through the upper pedestal 115, extends across the write gap 120 through the air bearing, flows through the lower pedestal 117, and flows into a lower pole layer 175. A lower pole layer-to-core connection, not shown, provides a return path for the flux.

The structure of present invention allows data density to be increased. One way the present invention allows data density to be increased is by tailoring the flux 122 pattern across the write gap 120. The larger upper pedestal pole 115 and the smaller lower pedestal pole 117 cause the flux 122 to have an inverted truncated conic profile as shown in FIG. 1. This feature increases flux 122 density adjacent to the lower pedestal pole by concentrating or focusing the flux adjacent to the lower pedestal pole 117.

Focused flux density adjacent the lower pedestal pole 117 reduces side writing. Side writing occurs when a bit is corrupted or changed as a result of writing to an adjacent bit or an adjacent track. The ability of the present invention to focus flux reduces side writing. Furthermore, it allows magnetic media to be made from higher coercivity materials that require higher flux to set bits. This in turn allows adjacent bits and tracks to be located closer together thereby improving data density.

The lower pedestal pole 117, as will be discussed in greater detail below, is formed before the upper pedestal pole 115. This allows the profile of the lower pedestal pole 117 to be more precisely controlled than upper pedestal pole 115. The lower pedestal pole is formed from a pole layer which is nearer the substrate than the layer used to form the upper pedestal pole 115. As such, the lower pole layer is a substantially flat surface. This provides two advantages. First, photoresist films are more uniform when spun on the flat or planar surface. Second, a better mask or reticle focus can be achieved on the overlying photoresist layer. Therefore, the structure of the present invention allows the narrow profile of the lower pedestal pole 117 to be more precisely controlled.

Figure 11:
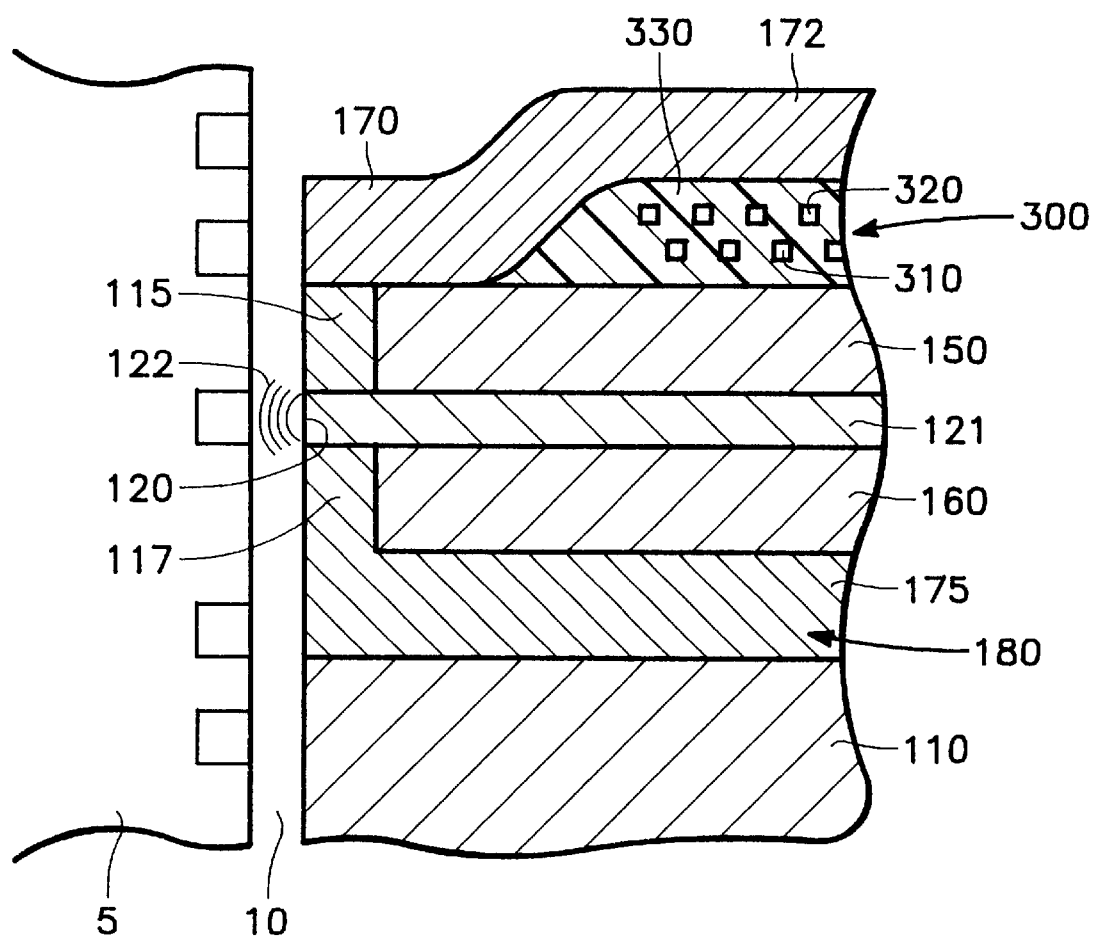
FIG. 11 is the side view of FIG. 10 along the 11—11 line.

Turning to FIG. 11, the present invention also provides an upper pedestal 115 for the upper pole. Providing the upper pedestal pole 115 allows an upper pole to be formed separately from the yoke 170 and core. This allows more precise profile control when forming the upper pole. One way this is accomplished is by eliminating focal difficulty which arises when exposing the varied height photoresist layer, not shown, used to define the yoke 170. As the combined height of the conductors 300 and filler material 330 is typically 5 to 20 microns, if the upper pedestal pole 115 was integrally formed with the yoke 170, etch profile control would be sacrificed due to difficulty with simultaneously focusing the mask exposure over the varied height of the surface.

The structure of the present invention also provides greater flux across the air gap 120. Simulation results show that by providing a narrow return or lower pedestal pole 117 connected to a lower or return layer 175 rather than providing a narrower upper or power delivery pedestal pole 115 connected to the yoke 170, greater flux 122 is delivered across the air gap 120. Reduction of the width of the upper pedestal pole 115 rather than the lower pedestal pole 117, therefore, causes a loss of flux 122 across the write gap 120 because flux through the upper or flux delivery pedestal pole 115 restricts flux delivery. If the width of the lower or return pedestal pole 117 is reduced, the flux power is not equally reduced. Consequently, more flux 122 may be delivered across the write gap 120. The ability to deliver greater flux 122 is necessary as new magnetic media improve data density by using higher coercivity materials which require higher flux thresholds to set bits.

In the presently preferred embodiment, the lower pedestal pole 117 is formed by masking and removing a portion of a lower pole layer so that the remaining lower pole layer 175 has the lower pedestal pole 117 integrally formed and extending from the remaining etched lower pole layer 175. In other words, lower pedestal 117 is what remains after the lower pole layer is partially removed to form partially removed lower pole layer 175. In the presently preferred embodiment, the lower pole layer 180 is partially removed by ion milling or by dry etching.

Although it is presently preferred to provide an integrally attached lower pedestal, it is also possible to form lower pedestal pole 117 from another magnetic material layer that is deposited, such as by electroplating, vapor deposition, plasma deposition, sputtering or other deposition technique, on top of the lower pole layer. Furthermore, it is possible to form the lower pole layer of multiple layers of magnetic material having varied amounts of permeability.

Forming the lower pedestal in this manner allows precise control of pedestal profile. The width of lower pedestal pole 117 may be precisely formed with a width of less than 2 microns at a height of 0.4 to 2 microns. In the presently preferred embodiment, the width of the lower pedestal pole preferably is formed having a width of 0.5 to 1.0 microns. Reducing the size of the lower pedestal pole 117 allows for reduction of the track width on the magnetic media by controlling the width 113 of the magnetic flux 122. As magnetic flux 122 is channeled or focused into the smaller lower pedestal pole 117, a more high density flux pattern having a narrower width 113 is produced. This improves data density.

The presently preferred method of fabrication also provides the structure of the lower pedestal pole 117 with substantially orthogonal sidewalls 190 & 192 to improve data density. Sidewalls 190 & 192 are formed substantially parallel to each other and substantially perpendicular to the remaining lower pole layer 175. The lower pedestal pole 117, therefore, may be formed in a rectangular solid shape. Control of sidewall 190 & 192 profile provides better control of the magnetic flux 122 between the upper pedestal pole 115 and the lower pedestal pole 117.

Figure 2:
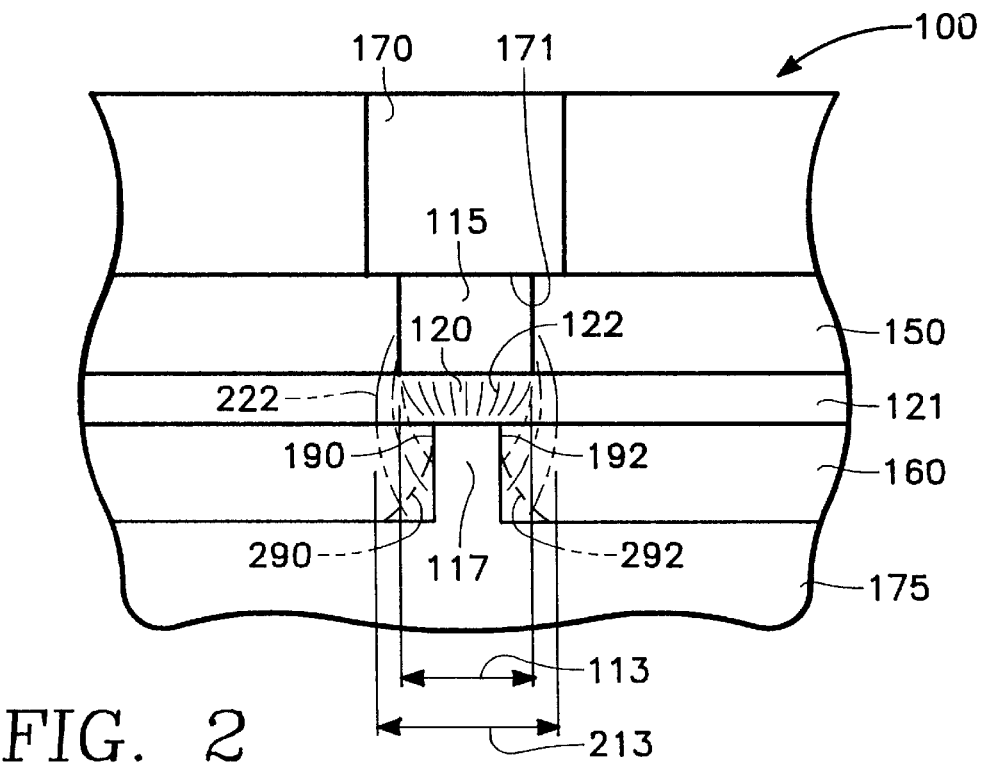
FIG. 2 is a front view of the pole structure of the thin film write head of the present invention illustrating the importance of controlling the lower pedestal profile.

FIG. 2 illustrates the importance of creating the lower pedestal pole 117 having a substantially orthogonal profile. As the profile of the sidewalls 190 & 192 fades as depicted by phantom sidewalls 290 & 292, the flux path 122 is altered as depicted by phantom flux lines 222. This causes a corresponding increase the track width as illustrated by reference numbers 113 and 213. If the magnetic flux 122 flows in the more focused path 113, magnetic media track width is reduced.

The presently preferred method of fabrication reduces and better defines the size of the structure, which allows better focusing of the flux to improve data density. As discussed above, focusing or concentrating the flux reduces side writing and also allows for magnetic media with higher coercivity to set bits. Therefore, adjacent bits and tracks may be located closer together thereby improving data density.

The Presently Preferred Method for Fabricating the Presently Preferred Embodiment of the Present Invention (FIGS. 3–11)

The preferred method for fabrication the thin film head of the present invention employs depositing, masking, and etching of multiple layers of materials.

Figure 3:
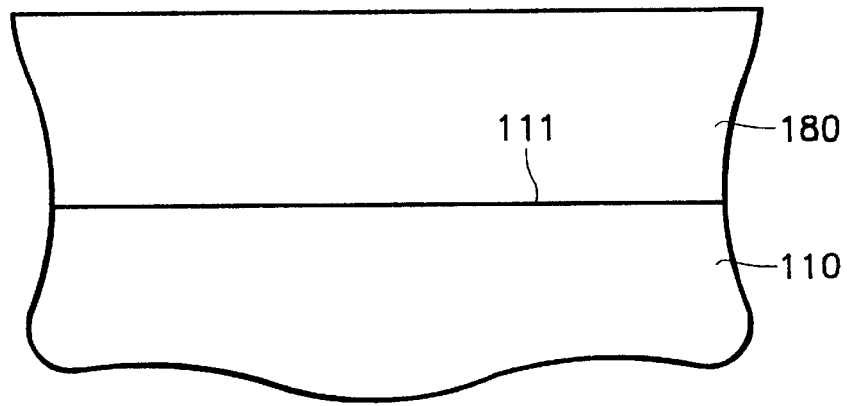
FIG. 3 is a front view of the lower or first pole layer on a substrate.

FIG. 3 depicts a substrate 110 having a lower pole layer 180 deposited over the substrate 110. The substrate 110 is formed of a non-magnetic material, such as $Al_2O_3$. In the preferred embodiment the substrate 110 is deposited over a previously formed read head. The surface 111 of the substrate layer 110 preferably is planarize using a chemical mechanical polish or CMP process prior to depositing the lower pole layer 180. The lower pole layer 180 may be deposited by a sputtering, chemical, electro-chemical, vapor, plasma, or other deposition technique. The substrate surface 111 is planarized so that the lower pole layer is uniformly deposited over the substrate 110.

The lower pole layer 180 is formed of a magnetic material, such as NiFe. In the preferred embodiment, the NiFe or permalloy layer has about 18% Fe. The lower pole layer 180 may be made with higher or lower percentages of iron. Furthermore, the lower pole layer may be made of some other magnetic material, such as CoZrX where X is a material such as Ta, or some other magnetic material, such as FeNX where X is a material such as Ta.

After the lower pole layer 180 has been deposited and planarized, photoresist is deposited and exposed using a conventional reticle or mask. The unexposed photoresist is removed to selectively uncover the lower pole layer 180 for removal. The uncovered lower pole layer is removed using conventional techniques, such as by ion milling, dry etch, or other technique to leave a lower or first pedestal pole 117 and lower pole layer 175 remaining as shown in FIG. 4.

Figure 4:
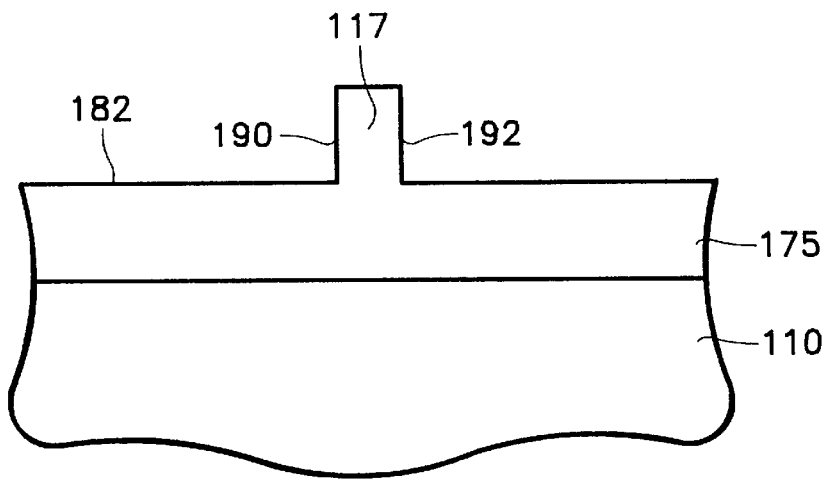
FIG. 4 is the front view of FIG. 3 with a portion of the lower pole layer removed to define the lower or first pedestal pole extending from the partially removed lower pole layer.

FIG. 4 shows the lower pedestal pole 117 formed from the lower pole layer 180, shown in FIG. 3, so that lower pedestal pole 117 extends from remaining lower pole layer 175. The lower pedestal pole 117 is integrally formed to the remaining lower pole layer 175 and extends orthogonally from the surface 182 of the remaining lower pole layer 175.

Forming the pedestal in this manner allows the lower pedestal pole 117 to be formed having substantially less than a 2.0 micron width while maintaining the sidewalls 190 & 192 substantially parallel to each other and substantially perpendicular to the surface 182 of the remaining lower pole layer 175. The present invention, will allow the structure of the lower pedestal pole to be formed below 1 micron at a height of 0.4 to 2 microns while controlling its profile. Furthermore, the present invention will also allow pedestal profile control below 1 micron. If the width is significantly reduced while significantly increasing the flux through the pedestal, the material selected for the pedestal must have sufficient permeability to sustain the flux without being saturated. Appropriate magnetic materials with high magnetizations, such as for example CoZrX or FeNX, should be selected to avoid pedestal saturation.

The presently preferred embodiment also provides the remaining lower pole layer 175 with a much greater width than does the lower pedestal 117. It is typically 25 to 200 microns wide and 0.5 to 3 microns thick. This provides an improved return path for the magnetic flux.

Figure 5:
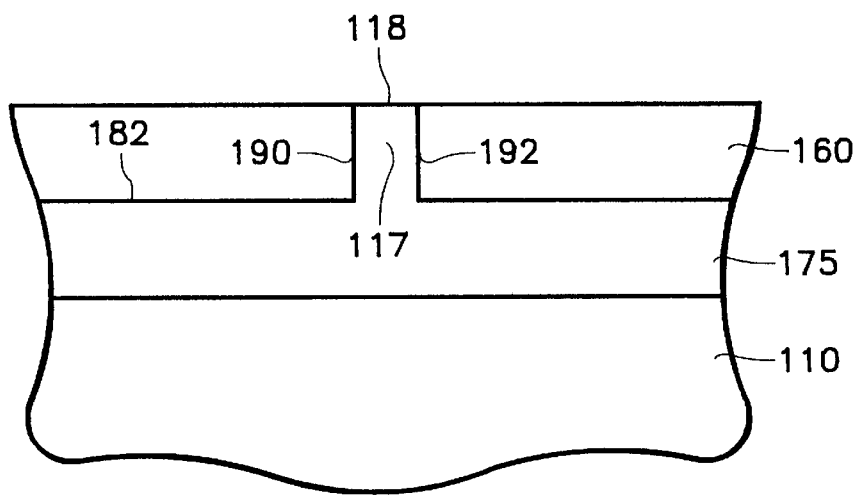
FIG. 5 is the front view of FIG. 4 further including a first filler layer after planarization.

Turning to FIG. 5, a filler layer 160 is deposited over the remaining lower pole layer 175 and over the lower pole pedestal 117. The filler layer 160 is a non-magnetic material, such as $Al_2O_3$. The filler layer 160 could be another non-magnetic material, such as $SiO_2$. The filler layer is planarized, such as by chemical mechanical polish to planarize and remove the filler layer from the surface 118 of the lower pedestal in preparation for depositing a write gap layer.

Figure 6:
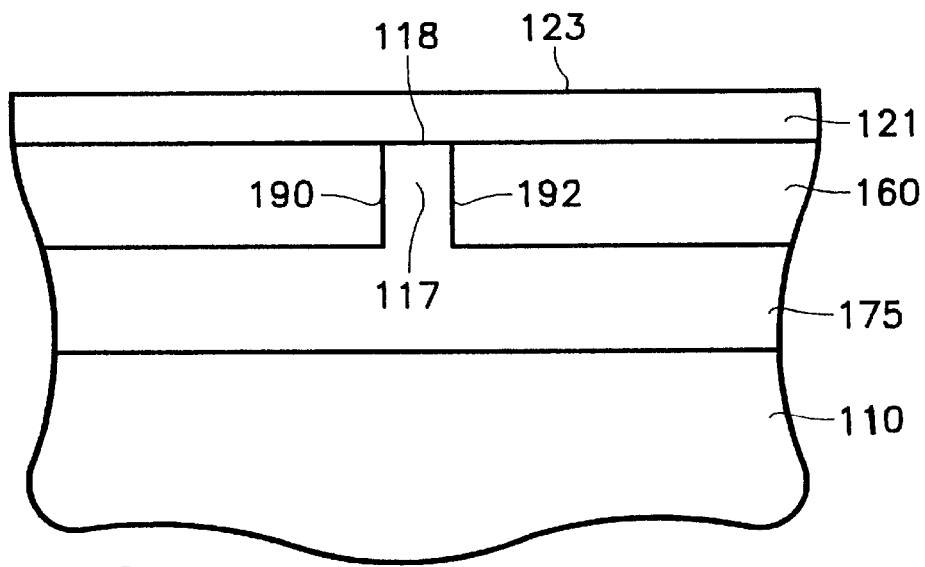
FIG. 6 is the front view of FIG. 5 further including a write gap layer.

Turning to FIG. 6, the write gap layer 121 is deposited over the planarized filler 160 layer and the lower pedestal pole 117. A non-magnetic material, such as $Al_2O_3$, is deposited, such as by sputtering or by chemical deposition, to form the write gap layer 121. The write gap material may be the same or different material than the filler layer 160. The write gap layer 121 is planarized to form planarized surface 123. The write gap surface 123 is planarized to prepare it for deposition of an upper pedestal pole layer 116, shown in FIG. 7. In the presently preferred embodiment, the planarize write gap layer 121 is about 0.2 microns to 0.5 microns thick.

Figure 7:
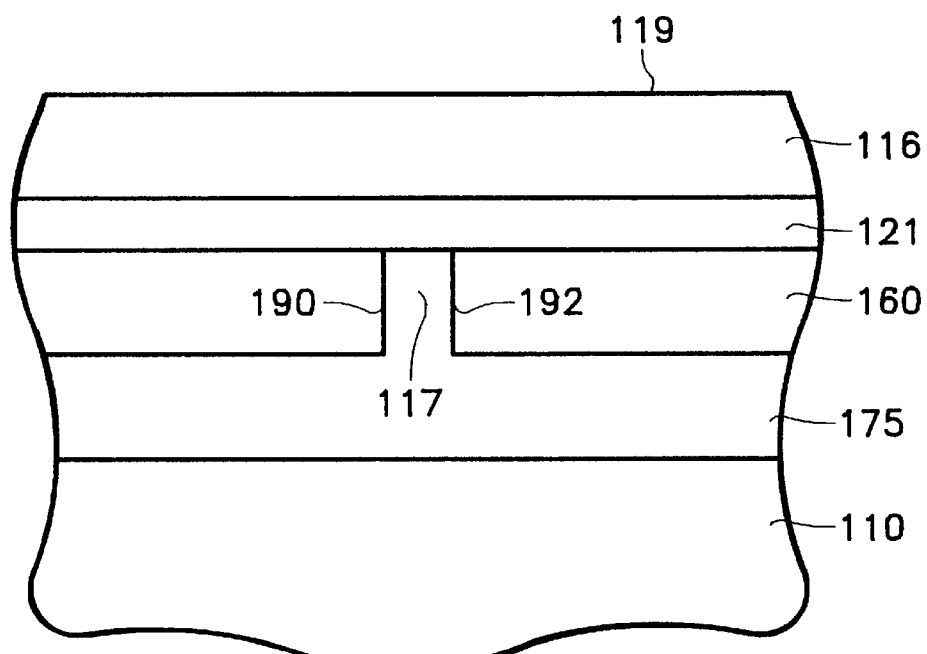
FIG. 7 is the front view of FIG. 6 further including an upper or second pole layer.

Turning to FIG. 7, the upper pedestal pole layer 116 is deposited over the planarized write gap layer 121. A magnetic material, such as NiFe with about 35% to 55% Fe, is deposited such as by a sputtering, chemical, electro-chemical, vapor, plasma, or other deposition technique, to form upper pedestal pole layer 116. The upper pedestal pole layer may be made of some other magnetic material, such as CoZrX where X is a material such as Ta, or some other magnetic material, such as FeNX where X is a material such as Ta.

After the upper pole layer 116 is deposited and planarized, photoresist is deposited over the planarized surface 119. The photoresist is exposed using a conventional reticle or mask. The unexposed photoresist is removed to selectively uncover the upper pole layer 116 for removal.

Figure 8:
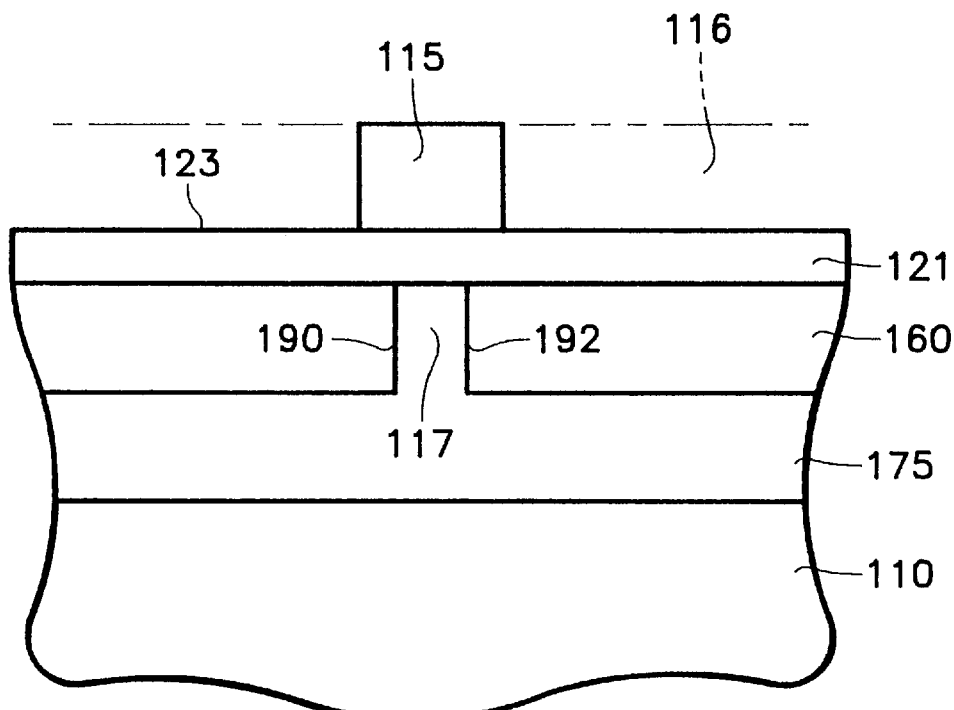
FIG. 8 is the front view of FIG. 7 with a portion of the second pole layer removed to define the upper or second pedestal pole.

Turning to FIG. 8, the selectively uncovered upper pole layer is removed using conventional techniques, such as by ion milling or by dry etch, to leave an upper or second pedestal pole 115 remaining. In the preferred embodiment, upper pedestal pole 115 is formed so that the central axis of upper pedestal pole 115 is aligned with the central axis of the lower pedestal pole 117. The upper pole layer 116 is removed so that pedestal pole 115 forms an isolated rectangular solid. A stepper process that generates a new reticle target after each step minimizes distance error in the alignment of all the structures of the present invention, and in particular of the lower and upper pedestal poles 117 and 115.

Figure 9:
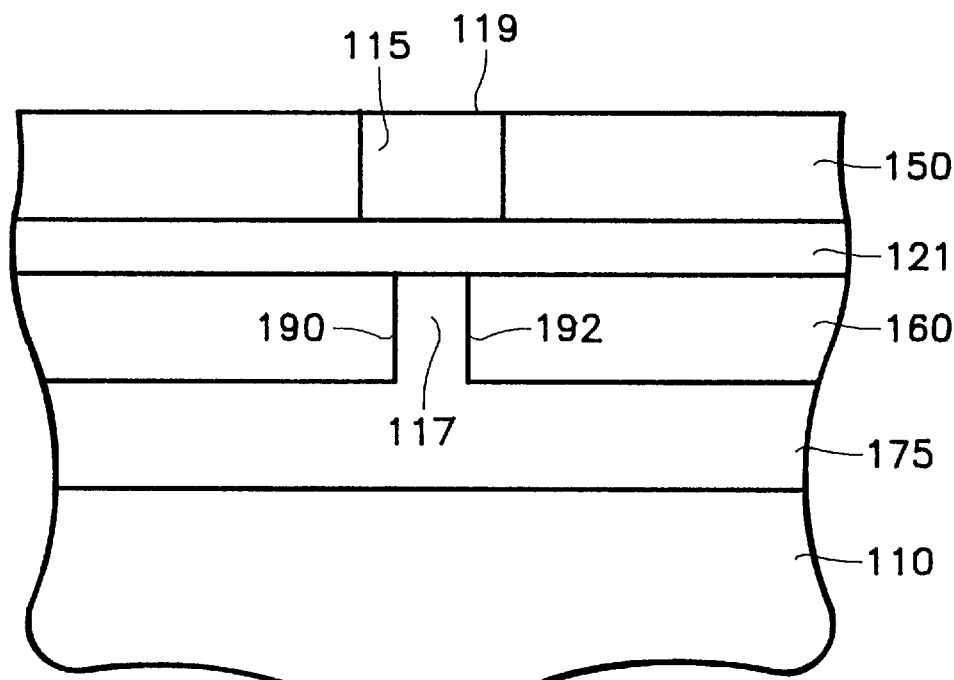
FIG. 9 is the front view of FIG. 8 further including a second filler layer after planarization.

Turning to FIG. 9, an upper filler layer 150 is deposited over the upper pedestal pole 115 and write gap layer 121. The upper filler layer or second filler layer 150 is a non-magnetic material, such as $Al_2O_3$. The upper filler layer 150 could be another non-magnetic, such as $SiO_2$ and could be the same material as lower filler layer 160 or write gap layer 121. The upper filler layer 150 is planarized, such as by chemical mechanical polish, so as to planarize and remove the filler layer from the upper surface 119 of the upper pedestal pole in preparation for attaching a yoke 170, shown in FIGS. 10 & 11.

Turning to FIG. 11, the yoke 170 is deposited after conductor coils 310 and 320, and filler 330 have been formed. The conductor coils 310 and 320 and the filler 330 are formed in layers using photoresist, etching, and depositing techniques as discussed above. The conductor coils 310 and 320, for example, may be formed by electroplating, sputtering, or other deposition technique. Consequently, the filler 330 surrounding the conductor coils 310 and 320 is formed in layers as are coil 310 and coil 320. It is significant to note the difference in height of the yoke above the conductor coils 310 and 320 with where it meets upper pedestal pole 115. As discussed above, the difference in height makes it difficult to control the profile of the yoke at for small structures. This is due to difficulties with simultaneously focusing the reticle image on the varying heights of the surface. Therefore, the upper pole pedestal 115 is provided along with the lower pole pedestal 117 to further control the profile of the flux 122, which writes to magnetic media 5 across the write gap 120 through air bearing 10.

Figure 10:
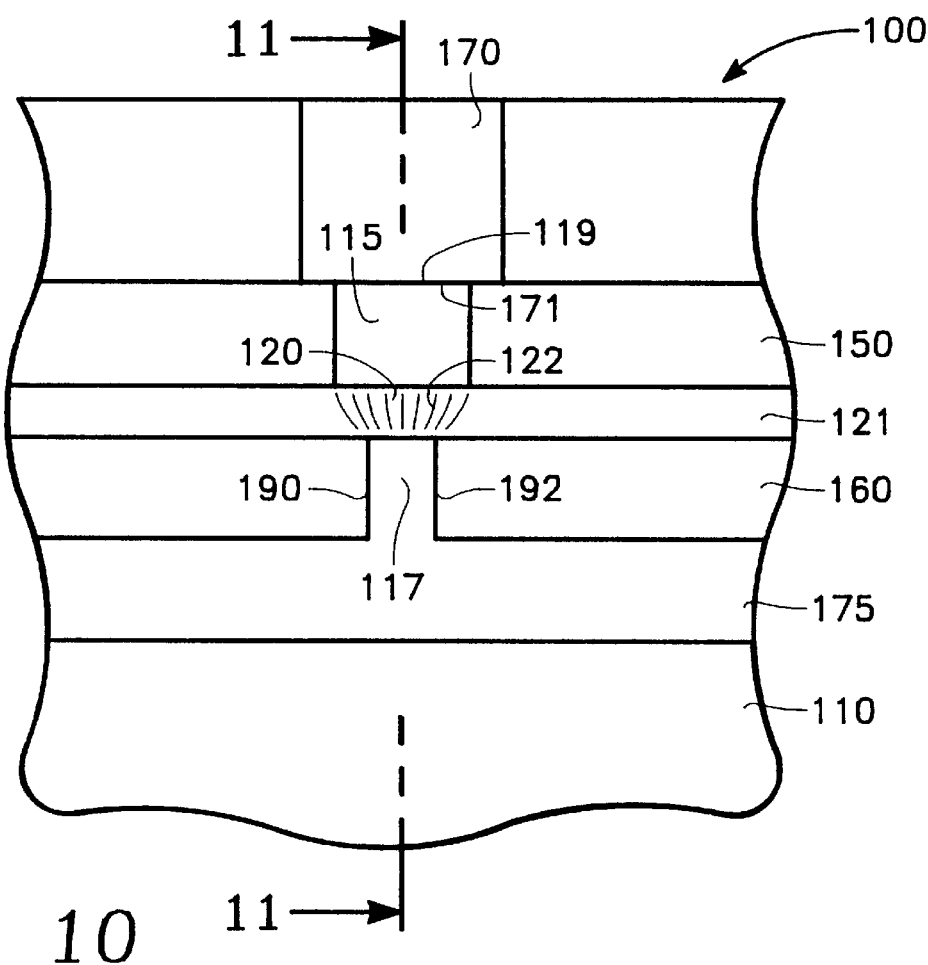
FIG. 10 is the front view of FIG. 9 further including a yoke structure.

Turning to FIG. 10, to define the yoke structure, the photoresist is exposed using a conventional reticle or mask. The unexposed photoresist is removed to define a yoke structure and to selectively uncover the surface 119 of the upper pedestal pole 115 in preparation for connection to the yoke. The yoke is formed by depositing a flux generation layer 172 formed of a magnetic material, such as NiFe with 35%–55% Fe. The material may be deposited by chemical vapor deposition or by sputtering. The flux generation layer 172 is deposited so that it also forms the core, not shown. Conductors 300, shown in FIG. 11, surround the core, not shown, to form a magnetic flux generator which provides magnetic flux through the core. The magnetic flux generated in the core, flows through the yoke 170 through the upper pedestal pole 115, across the write gap 120 via air bearing 10, through lower pole pedestal 117 and is returned through lower pole layer 180 to the core via the core-to-lower pole connection, not shown.

Referring the FIG. 10, process constraints make it difficult to precisely control the profile of the upper pole. The presently preferred embodiment of the present invention, therefore provides upper pedestal pole 115 and lower pedestal pole 117. The structure of the lower pedestal pole is controlled so that the lower pedestal pole 117 has substantially parallel sidewalls which are substantially perpendicular to the remaining lower pole layer 175. The profile of the lower pedestal pole is controlled so that the sidewalls 190 and 192 do not fade but instead are orthogonal to the remaining lower pole layer 175 for pedestal widths below 2 microns and below 1 micron at a height of 0.4 to 2 microns. The present will also allow pedestal profile control below 1 micron.

In addition to improving data density by better control of the structure of the lower pedestal pole 117, the present invention forms the smaller lower or return pedestal pole 117 coupled to the lower or return layer 175. This provides improved flux density across the write gap 121.

Figure 12:
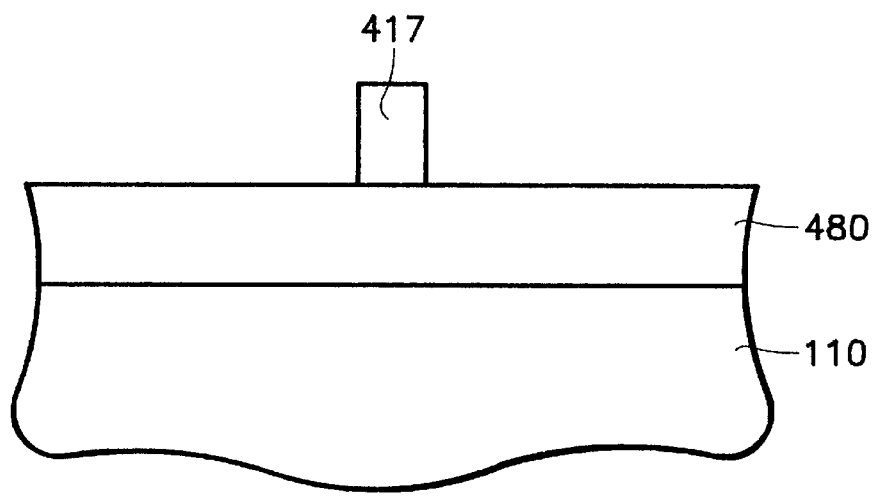
FIG. 12 is a front view of an alternate embodiment of a first pedestal pole after being formed by removing a portion of a layer on the first pole layer.

Alternate Embodiment (FIG. 12)

Turning to FIG. 12, in an alternate embodiment, the lower pedestal pole 417 is formed from a different magnetic material than the lower pole layer 480. The lower pedestal pole 417 may be formed of a material having a higher magnetic permeability than the lower pole layer.

To form the lower pedestal pole of a different material than the lower pole layer 480, a lower pedestal pole layer, not shown, is deposited over the lower pole layer 480 and completely or only partially removed using the photolithographic and removal techniques discussed above.

In this alternate embodiment, the lower pole layer 480 could be planarized to create a flat surface prior to depositing the lower pedestal pole layer, not shown.

Although the presently preferred embodiments of the present invention are described, other embodiments could be made that fall within the scope of the present invention. The true scope of the present invention, therefore, is not limited by the preferred embodiments, but rather is limited only by what is claimed below.

What is claimed is:

1. A thin film magnetic write head comprising:
    a) a first pole layer;
    b) a first pedestal coupled to the first pole layer;
    c) a second pedestal;
    d) a write gap between the first and second pedestal;
    e) a yoke coupled to the second pedestals;
    f) a magnetic flux generator coupled to the yoke, the generator being capable of delivering magnetic flux to the second pedestal; and
    g) the first pedestal having a smaller width than the second pedestal.

2. The thin film magnetic write head of claim 1 wherein the first pedestal is formed from the first pole layer.

3. The thin film magnetic write head of claim 1 wherein the first pedestal has sidewalls, and wherein the sidewalls are substantially planar and substantially perpendicular the first pole layer, and wherein the distance between the sidewalls is less than 2.0 microns.

4. The thin film magnetic write head of claim 3 wherein the first pedestal has a substantially rectangular solid structure.

5. The thin film magnetic write head of claim 3 wherein the first and second pedestals are coaxially aligned.

6. The thin film magnetic write head of claim 1 further comprising the first pole layer being coupled to the magnetic flux generator, and wherein the first pedestal and first pole layer being coupled so as to provide the return path for the magnetic flux generated by the magnetic flux generator.

7. The thin film magnetic write head of claim 1 wherein the first and second pedestals are coaxially aligned.

8. A thin film magnetic write head comprising:
    a) a first pole layer;
    b) a first pedestal coupled to the first pole layer;
    c) a second pedestal;
    d) a write gap between the first and second pedestal;
    e) a yoke coupled to the second pedestal;
    f) a magnetic flux generator coupled to the yoke, the generator being capable of delivering magnetic flux to the second pedestal;

g) the first pedestal being formed from the first pole layer; and h) the first pedestal having a smaller width than the second pedestal.

9. The thin film magnetic write head of claim 8 further comprising the first pole layer being coupled to the magnetic flux generator, and wherein the first pedestal and first pole layer being coupled so as to provide the return path for the magnetic flux generated by the magnetic flux generator.

10. The thin film magnetic write head of claim 8 wherein the first pedestal has sidewalls, and wherein the sidewalls are substantially planar and substantially perpendicular to the first pole layer, and wherein the distance between the sidewalls is less than 2.0 microns.

11. The thin film magnetic write head of claim 10 wherein the first pedestal has a substantially rectangular solid structure.

12. The thin film magnetic write head of claim 10 wherein the first and second pedestals are coaxially aligned.

13. The thin film magnetic write head of claim 8 wherein the first and second pedestals are coaxially aligned.

14. The thin film magnetic write head of claim 13 further comprising the first pole layer being coupled to the magnetic flux generator, and wherein the first pedestal and first pole layer being coupled so as to provide the return path for the magnetic flux generated by the magnetic flux generator.

15. A thin film magnetic write head comprising:

a) a first pole layer;

b) a first pedestal;

c) a second pedestal;

d) the second pedestal being coaxially aligned with the first pedestal;

e) a write gap between the first and second pedestal;

f) a magnetic flux generator coupled to the second pedestal;

g) the generator being capable of delivering magnetic flux through the second pedestal, across the write gap, and to the first pedestal;

h) the first pedestal having a smaller width than the second pedestal;

i) the first pedestal extending from the first pole layer; and j) the first pedestal being formed from the first pole layer.

16. The thin film magnetic write head of claim 15 further comprising a yoke, the yoke being located between the second pedestal and the magnetic flux generator so that the magnetic flux is delivered to the second pedestal via the yoke.

17. The thin film magnetic write head of claim 15 wherein the first pedestal has sidewalls, and wherein the sidewalls are substantially planar and are substantially orthogonal to the remaining first pole layer, and wherein the distance between the sidewalls is less than 2.0 microns.

18. The thin film magnetic write head of claim 17 wherein the first pedestal has a substantially rectangular solid structure.

19. The thin film magnetic write head of claim 15 further comprising the first pole layer being coupled to the magnetic flux generator so as to provide a return path for the magnetic flux.

20. A merged thin film head comprising:

a) a write head comprising:
(i) an upper pedestal;
(ii) a lower pedestal having narrower width than the upper pedestal;
(iii) a write gap between the upper and lower pedestals; and
(iv) a magnetic flux generator coupled to the upper and lower pedestals so as to be capable of delivering magnetic flux across the write gap.

21. The thin film head of claim 20 further comprising a lower pole layer, and wherein the lower pedestal is formed from the lower pole layer.

22. The thin film head of claim 21 wherein the lower pedestal is less than 2.0 microns wide.

23. The thin film head of claim 21 wherein the lower pedestal is less than 2.0 microns wide.

24. The thin film head of claim 20 wherein the lower pedestal is less than 2.0 microns wide.

25. A magnetic media storage and retrieval apparatus comprising:

a) a read head; and b) a write head comprising:
(i) an upper pedestal;
(ii) a lower pedestal having narrower width than the upper pedestal;
(iii) a write gap between the upper and lower pedestals; and
(iv) a magnetic flux generator coupled to the upper and lower pedestals so as to be capable of delivering magnetic flux across the write gap.

* * * * *

UNITED STATES PATENT AND TRADEMARK OFFICE
CERTIFICATE OF CORRECTION

PATENT NO : 6,055,138
DATED : April 25, 2000
INVENTOR(S): Zhupei Shi, Bill Crue, Lien-Chang Wang, and William Jensen It is certified that error appears in the above-identified patent and that said Letters Patent is hereby corrected as shown below:

On title page, item [75], please replace "Inventor: Zhupei Shi, San Jose, Calif." with ---Inventors: Zhupei Shi, San Jose; Bill Crue, San Jose; Lien-Chang Wang, Fremont; William Jensen, Fremont; all of California---

Signed and Sealed this

Twenty-seventh Day of February, 2001

Attest:

NICHOLAS P. GODICI

Attesting Officer

Acting Director of the United States Patent and Trademark Office